(12) United States Patent
Gentry et al.

(10) Patent No.: US 7,827,504 B2
(45) Date of Patent: Nov. 2, 2010

(54) METHODS AND APPARATUS FOR GENERATING AN EXECUTABLE FILE FROM A USE CASE

(75) Inventors: Joshua E. Gentry, Westford, MA (US); John A. Kowalonek, Clinton, MA (US); Nathan Aaron Johnson, Worcester, MA (US)

(73) Assignee: Sorriso Technologies, Inc., Acton, MA (US)

( * ) Notice: Subject to any disclaimer, the term of this patent is extended or adjusted under 35 U.S.C. 154(b) by 707 days.

(21) Appl. No.: 11/760,347

(22) Filed: Jun. 8, 2007

(65) Prior Publication Data

US 2007/0288845 A1 Dec. 13, 2007

Related U.S. Application Data

(60) Provisional application No. 60/812,701, filed on Jun. 9, 2006.

(51) Int. Cl.
*G06F 3/048* (2006.01)
(52) U.S. Cl. .............. 715/769; 715/210; 715/700; 709/219; 709/201
(58) Field of Classification Search .............. 715/769, 715/210, 762–765; 709/219

See application file for complete search history.

(56) References Cited

U.S. PATENT DOCUMENTS

| | | | | |
|---|---|---|---|---|
| 6,590,589 | B1 * | 7/2003 | Sluiman et al. | 715/751 |
| 2003/0115572 | A1 * | 6/2003 | Zondervan et al. | 717/109 |
| 2003/0177282 | A1 * | 9/2003 | Hejlsberg et al. | 709/328 |
| 2003/0217053 | A1 * | 11/2003 | Bachman et al. | 707/4 |
| 2004/0158837 | A1 * | 8/2004 | Sengodan | 719/313 |
| 2005/0188350 | A1 * | 8/2005 | Bent et al. | 717/106 |
| 2006/0074734 | A1 * | 4/2006 | Shukla et al. | 705/8 |
| 2006/0112059 | A1 * | 5/2006 | Weigt et al. | 706/47 |

* cited by examiner

*Primary Examiner*—Tadeese Hailu
(74) *Attorney, Agent, or Firm*—Chapin IP Law, LLC

(57) ABSTRACT

A system obtains a file associated with at least one interaction that satisfies a requirement of the application. The file (containing at least one instruction) is associated with a graphical user interface allowing a user to define at least one interaction, as a use case. The system transmits at least a portion of the file to a processor for processing of the portion of the file. The processor is selected based on at least one instruction. The system transmits a result of the processing to an engine in communication with the processor. The system transmits the result from the engine to a view renderer for execution of at least one instruction (that is contained in the file associated with at least one interaction that satisfies the requirement of the application). The system receives a response at the view renderer, and transmits the response from the view renderer to the engine.

21 Claims, 11 Drawing Sheets

208 OBTAIN A FILE ASSOCIATED WITH AT LEAST ONE INTERACTION THAT SATISFIES A REQUIREMENT OF THE APPLICATION, THE FILE ASSOCIATED WITH A GRAPHICAL USER INTERFACE ALLOWING A USER TO DEFINE THE AT LEAST ONE INTERACTION, AS A USE CASE, THE FILE CONTAINING AT LEAST ONE INSTRUCTION

209 RECEIVE, AT A SITE READER, A PLURALITY OF FILES ASSOCIATED WITH THE APPLICATION, THE PLURALITY OF FILES RECEIVED FROM THE GRAPHICAL USER INTERFACE ALLOWING A USER TO DEFINE THE AT LEAST ONE INTERACTION AS A USE CASE

210 PARSE, AT THE SITE READER, THE FILE TO OBTAIN THE AT LEAST ONE INSTRUCTION, THE FILE ASSOCIATED WITH THE PLURALITY OF FILES

↓

211 DETERMINE THE PROCESSOR SUITABLE FOR PROCESSING THE AT LEAST ONE INSTRUCTION

↓

212 DETERMINE THE AT LEAST A PORTION OF THE FILE REQUIRED FOR TRANSMITTAL TO THE PROCESSOR FOR PROCESSING THE AT LEAST ONE INSTRUCTION

OR

213 TRANSMIT, FROM THE SITE READER, TO THE DATA MANAGER, DATA ASSOCIATED WITH AT LEAST ONE FILE ASSOCIATED WITH THE PLURALITY OF FILES RECEIVED FROM THE GRAPHICAL USER INTERFACE

*FIG. 6*

214 TRANSMIT AT LEAST A PORTION OF THE FILE TO A PROCESSOR FOR PROCESSING OF THE AT LEAST A PORTION OF THE FILE, THE PROCESSOR SELECTED BASED ON THE AT LEAST ONE INSTRUCTION

215 TRANSMIT THE AT LEAST A PORTION OF THE FILE TO A PROCESSOR FROM THE SITE READER

216 TRANSMIT AT LEAST A PORTION OF THE FILE TO A SCREEN PROCESSOR, THE AT LEAST A PORTION OF THE FILE INCLUDING SCREEN OBJECTS NECESSARY TO RENDER A SCREEN WITHIN THE APPLICATION

217 RECEIVE, AT THE SCREEN PROCESSOR, DATA FROM THE DATA MANAGER, THE DATA ASSOCIATED WITH RENDERING THE SCREEN WITHIN THE APPLICATION

*FIG. 7*

218 TRANSMIT THE AT LEAST A PORTION OF THE FILE TO A PROCESSOR FROM THE SITE READER

219 TRANSMIT THE AT LEAST A PORTION OF THE FILE TO A COMMAND PROCESSOR, THE COMMAND PROCESSOR CAPABLE OF EXECUTING AN ACTION INDICATED BY THE AT LEAST A PORTION OF THE FILE

220 DETERMINE, FROM THE AT LEAST A PORTION OF THE FILE, A SUB PROCESSOR SUITABLE FOR PROCESSING THE AT LEAST A PORTION OF THE FILE

221 TRANSMIT THE AT LEAST A PORTION OF THE FILE TO THE SUB PROCESSOR, THE SUB PROCESSOR IN COMMUNICATION WITH A DATA MANAGER

222 RECEIVE, AT THE SUB PROCESSOR, DATA NECESSARY TO EXECUTE THE ACTION INDICATED BY THE AT LEAST A PORTION OF THE FILE, THE DATA RECEIVED FROM THE DATA MANAGER

223 EXECUTE THE ACTION, INDICATED BY THE AT LEAST A PORTION OF THE FILE, AT THE SUB PROCESSOR

224 TRANSMIT, TO THE DATA MANAGER, DATA RESULTING FROM THE ACTION EXECUTED AT THE SUB PROCESSOR

*FIG. 8*

233 TRANSMIT THE RESULT FROM THE ENGINE TO A VIEW RENDERER FOR EXECUTION OF THE AT LEAST ONE INSTRUCTION CONTAINED IN THE FILE ASSOCIATED WITH THE AT LEAST ONE INTERACTION THAT SATISFIES THE REQUIREMENT OF THE APPLICATION

234 TRANSMIT A SCREEN REPRESENTATION, FROM THE ENGINE TO THE VIEW RENDERER, THE SCREEN FILE RECEIVED FROM A SCREEN PROCESSOR

*FIG. 11*

METHODS AND APPARATUS FOR GENERATING AN EXECUTABLE FILE FROM A USE CASE

CLAIM TO BENEFIT OF PROVISIONAL PATENT APPLICATION FILING

This Utility patent application claims the benefit of the filing date of co-pending U.S. Provisional Application for patent having U.S. Ser. No. 60/812,701, filed in the United States Patent Office on Jun. 9, 2006 entitled "METHODS AND APPARATUS FOR GENERATING A WEB SITE FROM A USE CASE". The present application has co-inventorship with this provisional and is assigned to the same Assignee. The entire contents and teachings of this provisional application are hereby incorporated by reference herein.

BACKGROUND

Graphical user interfaces provide mechanisms for a software application and related processes operating on a computer system to graphically present information to a user of the computer system. There are numerous conventional techniques that a software application can utilize to generate or construct information to be presented within a graphical user interface. As an example, a software program may be configured with software code that produces data, graphics or other information encoded in one or more pages of a markup language such as the hypertext markup language (HTML). A software program such as a browser may display the HTML pages for presentation of the data, graphics or other information to user on computer display or monitor. As another example, a software application may encode information in extensible markup language (XML) in order to allow this information to be transferred to other software applications for various processing purposes. A software application equipped to utilize XML processing technologies can apply an extensible style sheet language (XSL) style sheet or an XSL transformation (XSLT) to process or convert a raw XML data source formatted in one manner into an output format that can be displayed on a graphical user interface. As a specific example, XSLT can perform an XML to HTML transformation so that XML encoded data can be displayed within an HTML compatible interface.

Typically, conversion of an XML data source using an XSL style sheet into a format that can be rendered in a graphical user interface requires that an application developer build Java classes. As an example, if an XML data source contains financial information and a user desires to see different types of reports concerning various relationships expressed in the data within the financial information, a software developer can use XSL and an XSLT tool to extract the desired data and then creates a Java class for each different type of report that the user desires to view. The Java classes are responsible for formatting the particular extracted XML information from the XML data source for presentation in a report such as a particular table style or graph within the graphical user interface.

SUMMARY

Conventional technologies for interactive components of applications (i.e., software applications, web based applications, etc.), suffer from a variety of deficiencies. In particular, conventional technologies for creating interactive components of applications are limited in that typically, the group of people skilled in defining the requirements for a given application (for example, business analysts) is separate from the group of people (for example engineers) skilled in implementing (i.e., coding) those requirements for the application. Conventional technologies that convert use cases into applications, require knowledge of object oriented programming, or other software coding techniques.

Embodiments disclosed herein significantly overcome such deficiencies and provide a system that includes a computer system executing a use case application executing process that transforms a use case (for example, a use case defined by a business analyst) into an executing, interactive, component of an application, thus creating a use case based application. The use case application executing process receives a plurality of files that represent the use case based application. The plurality of files is generated either via an application generating graphical user interface, or by writing the use cases by hand. The plurality of files contains information associated with all the components of the application. For example, a file in the plurality of files may contain information associated with a particular screen that is rendered within an application rendering graphical user interface when the application is executed. The file may also contain information associated with what data is to be displayed on the screen, what buttons/components/etc., are on the screen, what links are displayed on the screen, what is the next action of the application based on a user interaction with the screen (i.e., what happens next when a user clicks a button on the screen), etc. In other words, the files contain the rules for displaying all the screens and performing all of the operations associated with executing the application. In an example embodiment, the files contain eXtensible Markup Language (XML).

The plurality of files is received at a software component of the use case application executing process, the site reader. The site reader parses the plurality of files to determine which use case step(s) should be processed next by the use case application executing process during the execution of the application. In an example embodiment, the site reader parses a file containing XML code. Based on the parsing, the site reader transmits XML data objects to a data manager. The data manager receives data during the use case application executing process, and sends data to various components of the use case application executing process. The site reader may send a portion of the file to a processor. In one example embodiment, the site reader transmits a portion of the file (i.e., XML action groups) to a command processor. The command processor executes an action of the application based on the contents of the portion of the file. In an example embodiment, the site reader transmits a portion (i.e., screen objects) of the file to a screen processor. The screen processor the screen processor creates a high level description of the next interactive step, defining the values to present and the paths available to the external entity (i.e., the execution application). In an example embodiment, the screen processor builds a screen that is to be rendered on the application rendering graphical user interface during the execution of the application. In other words, the screen processor builds the 'next' screen that is to be displayed during the execution of the application.

In an example embodiment, the command processor transmits the portion of the file to a sub processor such that the sub processor executes the action associated with the portion of the file. The sub processors may include, but are not limited to:

Audit Processor
Authorization Processor
Profile Processor
Authenticate Processor Workflow Processor
SQL Processor
Control Processor
Math Processor
Message Processor Each of the sub processors may receive data values from the data manager. Upon completion of their respective processing each of the sub processors may transmit data values to the data manager for later use by other components of the use case application executing process.

In an example embodiment, the command processor executes any action associated with the portion of the file that was transmitted, and determines that the next step in the execution of the application is the generation and rendering of a screen. The command processor transmits notification of this information to an engine. The engine may transmit data to the data manager to update the data repository stored within the data manager. The engine then transmits a command to the screen processor to build the screen identified by the command processor.

The screen processor may receive direction to build a screen from the engine and receives the structure of the screen from the site reader. If data values are necessary to build the screen, the screen processor may also receive these data values from the data manager. The screen processor builds internal object representation of the screen representation, and transmits the screen representation to the engine. The engine then transmits the screen representation to a view renderer. The view renderer can then build the screen in such a manner that is appropriate for the application. In an example embodiment, the screen sends the screen components to the view renderer. The view renderer first creates an XML representation of the screen, then renders the XML file as a screen within the application. In an example embodiment, a user interacts with the screen within the application (operating on the application rendering graphical user interface). Interaction with the screen by the user is converted into a response that is transmitted to the view renderer. The view renderer decodes the response, taking into account how the screen was created, and the result (i.e., the response) is then transmitted to the engine where the engine determines which of the processors (i.e., the command processor or the screen processor) is required to process the response.

The use case application executing process obtains a file associated with at least one interaction that satisfies a requirement of the application. The file is associated with an application generating graphical user interface that allows a user to define at least one interaction, as a use case. The file contains at least one instruction. The use case application executing process transmits at least a portion of the file to a processor for processing of the portion of the file. The processor is selected based on at least one instruction. The use case application executing process transmits a result of the processing to an engine in communication with the processor. The use case application executing process then transmits the result from the engine to a view renderer for execution of at least one instruction contained in the file (associated with at least one interaction that satisfies the requirement of the application).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Sorriso Technologies, Inc., of Acton Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 illustrates a flowchart of a procedure performed by the system of FIG. 1 when the use case application executing process obtains a file associated with at least one interaction that satisfies a requirement of the application, and receives, at a site reader, a plurality of files associated with the application, according to one embodiment disclosed herein.

FIG. 7 illustrates a flowchart of a procedure performed by the system of FIG. 1 when the use case application executing process transmits at least a portion of the file to a processor for processing of at least a portion of the file, according to one embodiment disclosed herein.

FIG. 8 illustrates a flowchart of a procedure performed by the system of FIG. 1 when the use case application executing process transmits at least a portion of the file to a processor from at least one of the site reader, and the engine, according to one embodiment disclosed herein.

FIG. 11 illustrates a flowchart of a procedure performed by the system of FIG. 1 when the use case application executing process transmits the result from the engine to a view renderer for execution of at least one instruction contained in the file, according to one embodiment disclosed herein.

DETAILED DESCRIPTION

Embodiments disclosed herein include methods, software and a computer system that performs a use case application executing process that obtains a file associated with at least one interaction that satisfies a requirement of the application. The file is associated with an application generating graphical user interface that allows a user to define at least one interaction, as a use case. The file contains at least one instruction. The use case application executing process transmits at least a portion of the file to a processor for processing of the portion of the file. The processor is selected based on at least one instruction. The use case application executing process transmits a result of the processing to an engine in communication with the processor. The use case application executing process then transmits the result from the engine to a view renderer for execution of at least one instruction contained in the file (associated with at least one interaction that satisfies the requirement of the application). In an example embodiment, the view renderer receives a response and transmits the response to the engine where the engine distributes the response based on the contents of the response (i.e., to the command processor and/or the screen processor).

Figure 1:
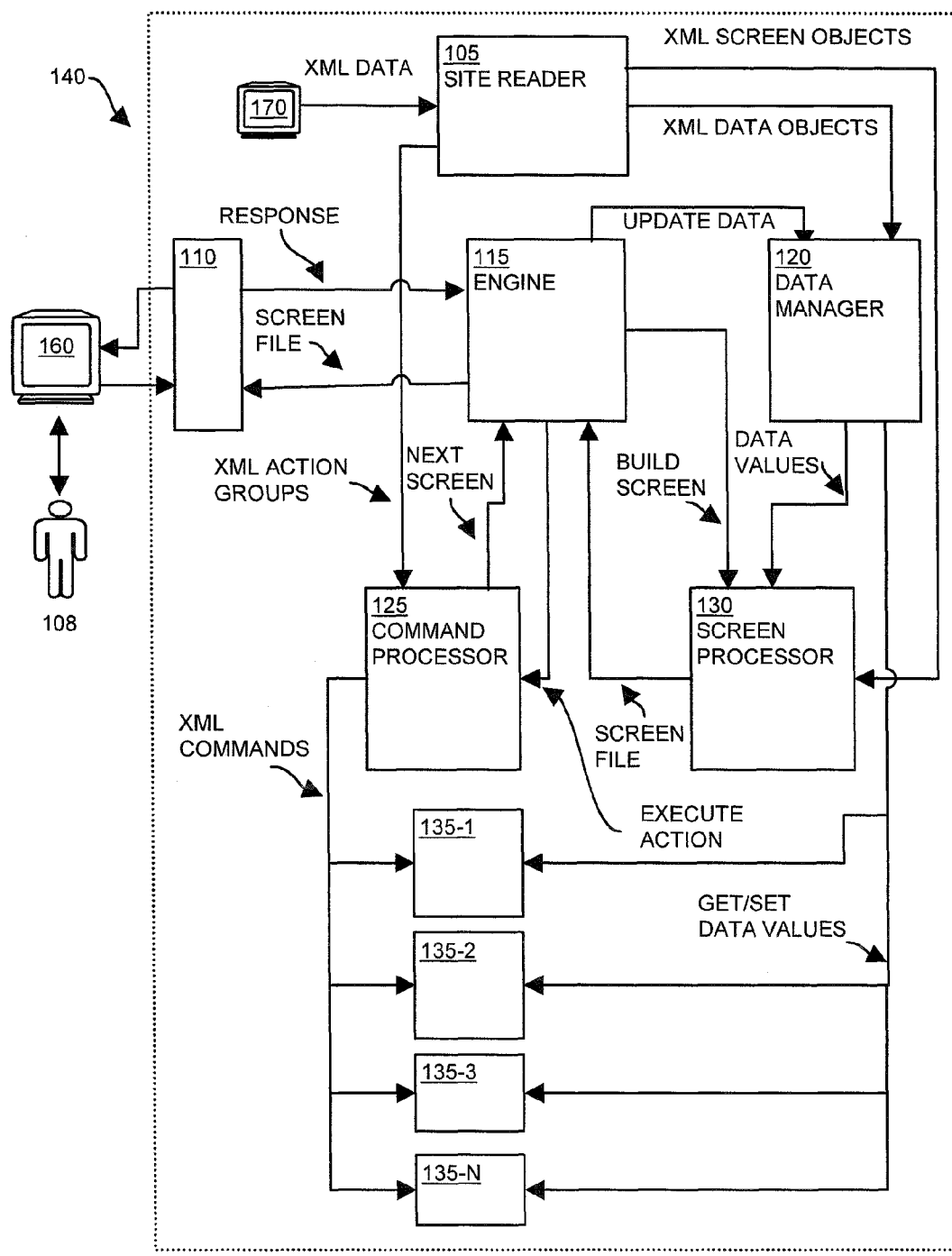
FIG. 1 is a block diagram according to one embodiment disclosed herein.

FIG. 1 is a block diagram illustrating example embodiments disclosed herein. The use case application executing process 140 receives a plurality of files, for example, XML data that represents the application. The plurality of files is received at the site reader 105, from an application generating graphical user interface 170. The site reader 105 parses the plurality of files to determine which use case step(s) should be processed next by the use case application executing process 140 during the execution of the application. The site reader transmits XML data objects to a data manager 120. The data manager 120 receives data during the use case application executing process 140, and sends data to various components of the use case application executing process 140. The site may transmit a portion of the file (i.e., XML action groups) to a command processor 125. The command processor 125 executes an action of the application based on the contents of the portion of the file. The site reader 105 may transmit a portion (i.e., XML screen objects) of the file to a screen processor 130. The screen processor 130 builds a screen that is to be rendered on an application rendering graphical user interface 160 during the execution of the application. The command processor 125 may transmit the portion of the file to a sub processor 135-N such that the sub processor executes the action (i.e., XML commands) associated with the portion of the file. Each of the sub processors 135-N may send and receive data values from the data manager 120. The command processor 125 may determine that the next step in the execution of the application is the generation and rendering of a screen. The command processor 125 may transmit notification of this information (i.e., next screen information) to an engine 115. The engine 115 may transmit data to the data manager 120 to update the data repository stored within the data manager 120. The engine 115 may transmit a command (i.e., a build screen command) to the screen processor 130 to build the screen identified by the command processor 125.

The screen processor 130 may receive direction to build a screen from the engine 115 or the site reader 105. If data values are necessary to build the screen, the screen processor 130 may also receive these data values from the data manager 120. The screen processor 130 builds a screen representation, and transmits the screen representation to the engine 115. The engine 115 then transmits the screen representation to a view renderer 110. The view renderer 110 renders the screen representation as a screen within the application via an application rendering graphical user interface 160. A user 108 may interact with the screen within the application on the application rendering graphical user interface 160. Interaction with the screen by the user 108 is converted into a response that is transmitted to the view renderer. The response is then transmitted to the engine 115 where the engine 115 may determine which of the processors (i.e., the command processor 125 or the screen processor 130) is required to process the response.

Figure 2:
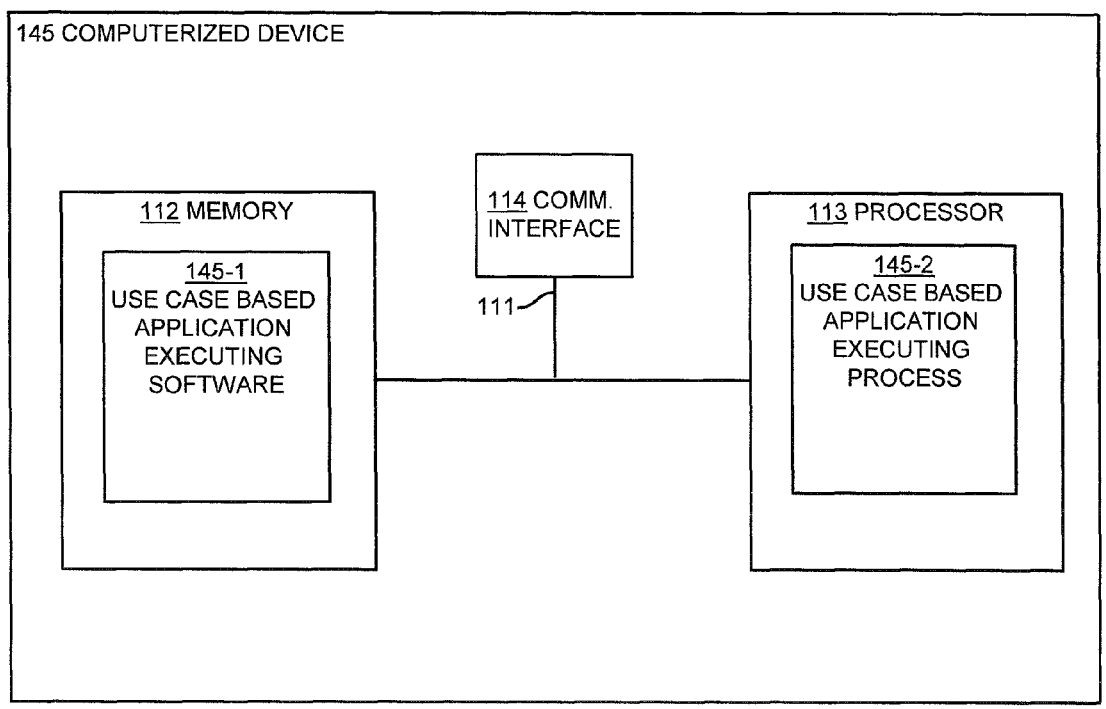
FIG. 2 shows a high-level block diagram of a computer system according to one embodiment disclosed herein.

FIG. 2 illustrates an example architecture of a computer system 145. The computer system 145 may be any type of computerized device such as a personal computer, workstation, portable computing device, console, laptop, network terminal or the like. In this example, the computer system 145 includes an interconnection mechanism 111 that couples a memory system 112, a processor 113, and a communications interface 114. The communications interface 114 enables the computer system 145 to communicate with other devices (i.e., other computers) on a network (not shown). This can allow access to the use case application executing software 140-1 by remote computer systems.

The memory system 112 may be any type of computer readable medium that is encoded with an the use case application executing software 140-1 that may be embodied as software code such as data and/or logic instructions (e.g., code stored in the memory or on another computer readable medium such as a removable disk) that supports processing functionality according to different embodiments described herein. During operation of the computer system 145, the processor 113 accesses the memory system 112 via the interconnect 111 in order to launch, run, execute, interpret or otherwise perform the logic instructions of the use case application executing software 140-1. Execution of the use case application executing software 140-1 in this manner produces processing functionality in a use case application executing process 140-2. In other words, the use case application executing process 140-2 represents one or more portions of runtime instances of the use case application executing software 140-1 (or the entire software 140-1) performing or executing within or upon the processor 113 in the computerized system 145 at runtime. It is to be understood that embodiments disclosed herein include the applications/software (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications/software operating within the processor 113 as the processes. While not shown in this example, those skilled in the art will understand that the computer system may include other processes and/or software and hardware components, such as an operating system, that have been left out of this illustration for ease of description.

Figure 3:
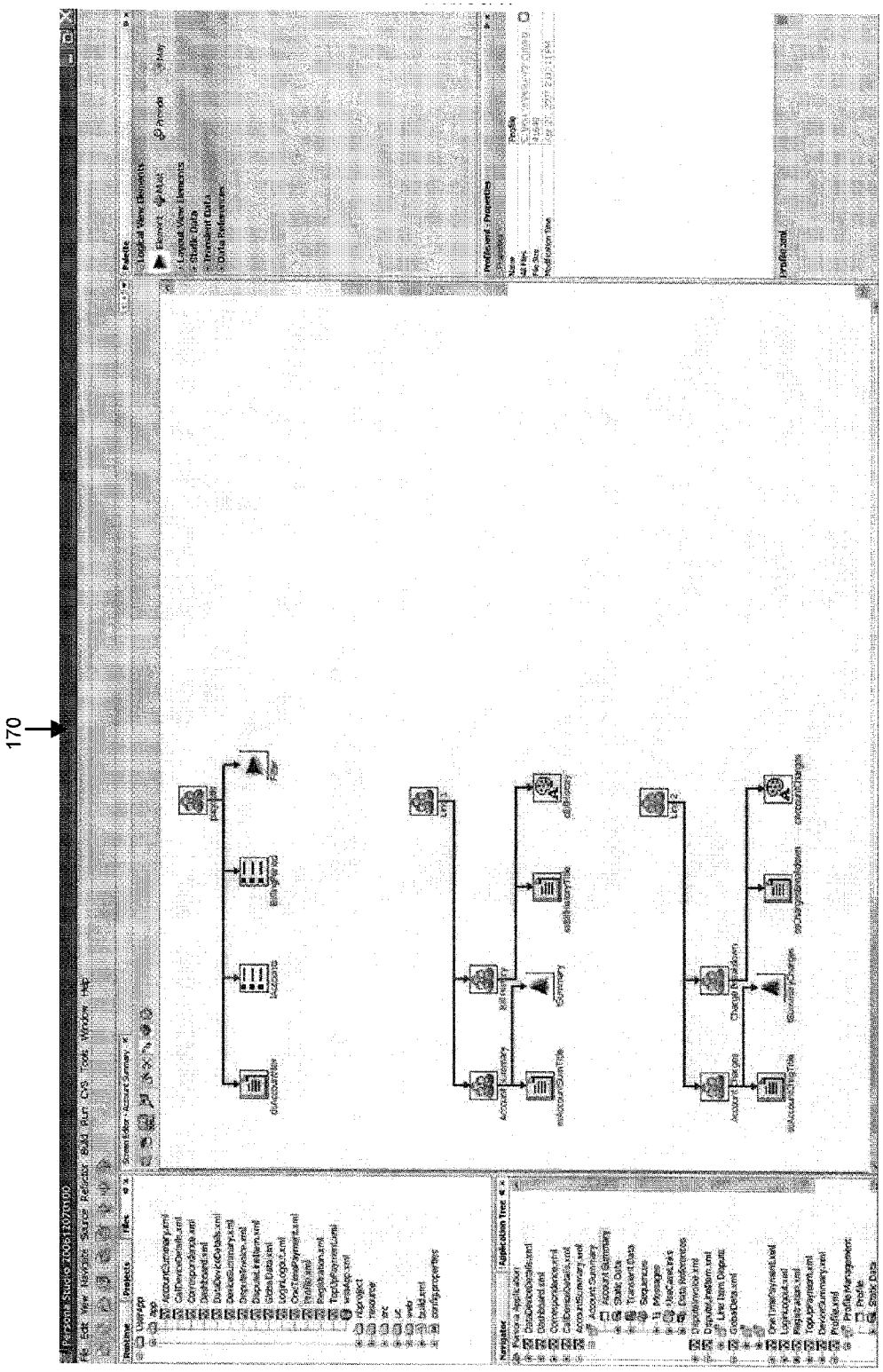
FIG. 3 is a screenshot of an application generating graphical user interface, according to one embodiment disclosed herein.

FIG. 3 is an example screenshot of an application generating graphical user interface 170. An application generating user (not shown) may generate use cases for the application via the application generating graphical user interface 170. The use case application executing process 140-2 converts those use cases to, for example, XML code. Users skilled in XML coding may modify the files containing XML code, and then render those changes within the application generating graphical user interface 170. This allows greater flexibility in creating the application since both XML skilled users and non-XML skilled users can interact (i.e., modify, enhance, etc.) with the same use cases (and the corresponding generated XML code) and contribute to the generating of the application. In an example embodiment, the application generating graphical user interface 170 provides tools, screens, sequences of screens, etc., that when saved, produce an XML version of a use case. The an application generating graphical user interface 170 may also provide are HyperText Markup Language (HTML) files or Rich Text Format (RTF) documents, as well as documentation that can be used as a contractual document of requirements.

Further details of configurations explained herein will now be provided with respect to a flow chart of processing steps that show the high level operations disclosed herein to perform the a use case application executing process 140-2.

Figure 4:
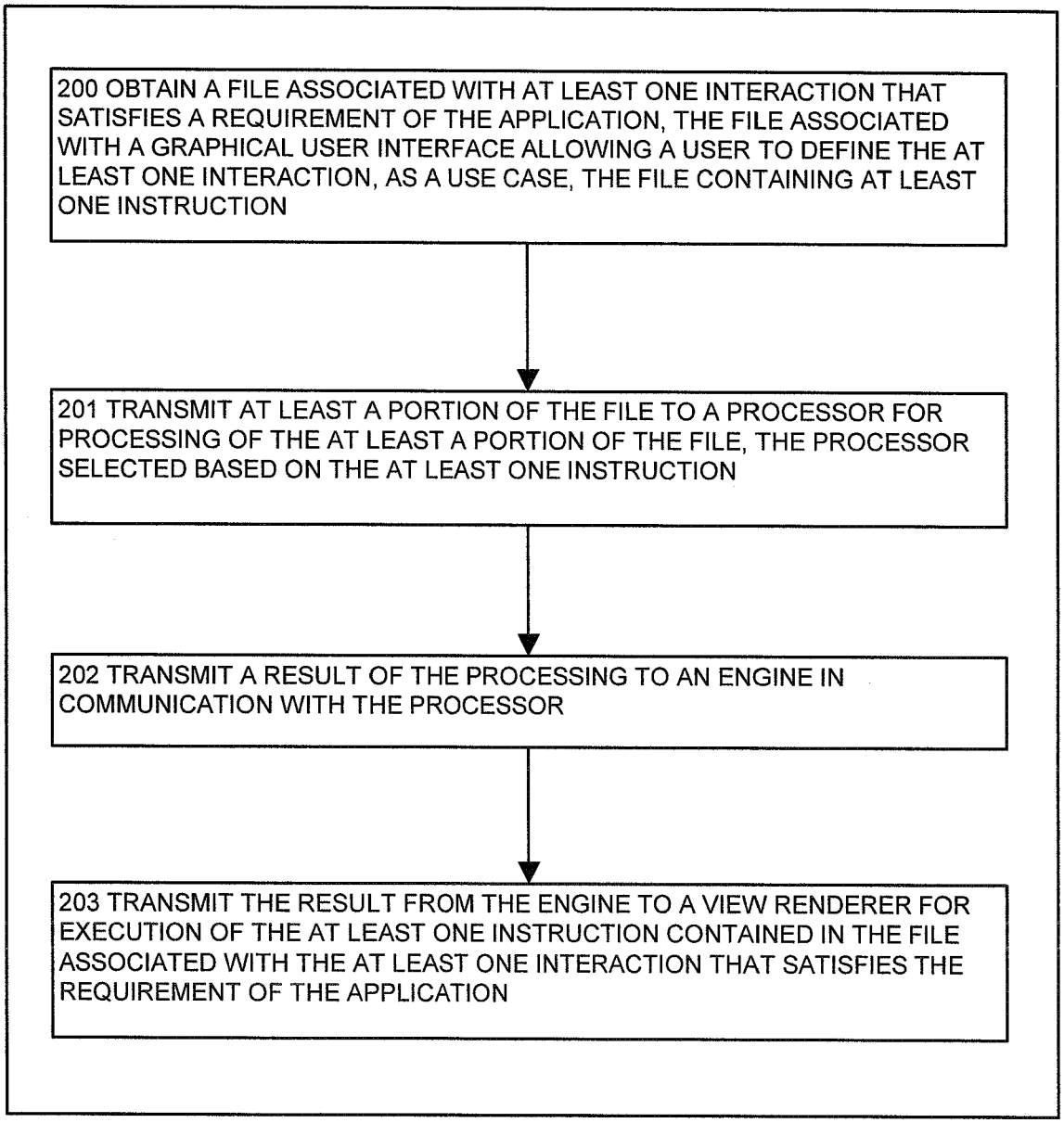
FIG. 4 illustrates a flowchart of a procedure performed by the system of FIG. 1 when the use case application executing process obtains a file associated with at least one interaction that satisfies a requirement of the application, according to one embodiment disclosed herein.

FIG. 4 is a flowchart of the steps performed by the use case application executing process 140-2 when it obtains a file associated with at least one interaction that satisfies a requirement of the application.

In step 200, the use case application executing process 140-2 obtains a file associated with at least one interaction that satisfies a requirement of the application. The file (for example, XML data) is associated with an application generating graphical user interface 170 that allows a user 108 to define at least one interaction, as a use case. The file contains at least one instruction for execution of the application. FIG. 3 is an example embodiment of an application generating graphical user interface 170 that allows an application generating user (not shown), such as a business analyst, to define a use case that satisfies a requirement of the application. In an example embodiment, the application generating graphical user interface 170 allows an application generating user (not shown) to generate a readable use case. The readable use case provides more flexibility during various aspects of the application generating process since all persons involved in the process of generating the application can understand the requirements that are the basis of the use case.

In step 201, the use case application executing process 140-2 transmits at least a portion of the file to a processor for processing of at least a portion of the file. The processor is selected based on at least one instruction. The site reader 105 receives the plurality of files generated by an application generating graphical user interface 170. A file (from the plurality of files) may contain information associated with a particular screen that is rendered within an application rendering graphical user interface 160 when the application is executing. The files contain the rules for displaying all the screens, and performing all of the operations associated with executing the application. The site reader 105 begins to process the instructions contained within the file by sending chunks of the file to the appropriate processor (i.e., the command processor 125 or the screen processor 130). The chunks of the file contain the necessary information for the respective processor (i.e., the command processor 125 or the screen processor 130) to process the instruction(s) within that chunk of the file. In an example embodiment, the site reader 105 so maintains revisions information associated with the plurality of files associated with the application. If the format of the files change (i.e., changes to XML format within the files), the site reader 105 performs a sanity check of the interfaces so that any changes to the XML format will not impact the overall functionality of the application.

In step 202, the use case application executing process 140-2 transmits a result of the processing to an engine 115 in communication with the processor (i.e., the command processor 125 or the screen processor 130). In an example embodiment, the command processor 125 transmits a result to the engine 115. The result indicates that the command processor 125 has executed an action (for example, the command processor 125 has executed XML action groups sent to the command processor 125 by the site reader 105). The command processor 125 may also send notification to the engine 115 that the next step in the application is for a screen to be built (by the screen processor 130). In this scenario, the engine 115 would then send notification to the screen processor 130 to build the necessary screen.

In step 203, the use case application executing process 140-2 transmits the result from the engine 115 to a view renderer 110 for execution of at least one instruction. The instruction is contained in the file (as a use case) associated with at least one interaction that satisfies the requirement of the application. In an example embodiment, the result is standalone screen representation containing all the necessary coding needed (i.e., display items, buttons, data, etc.) to render the screen on the application rendering graphical user interface 160.

Figure 5:
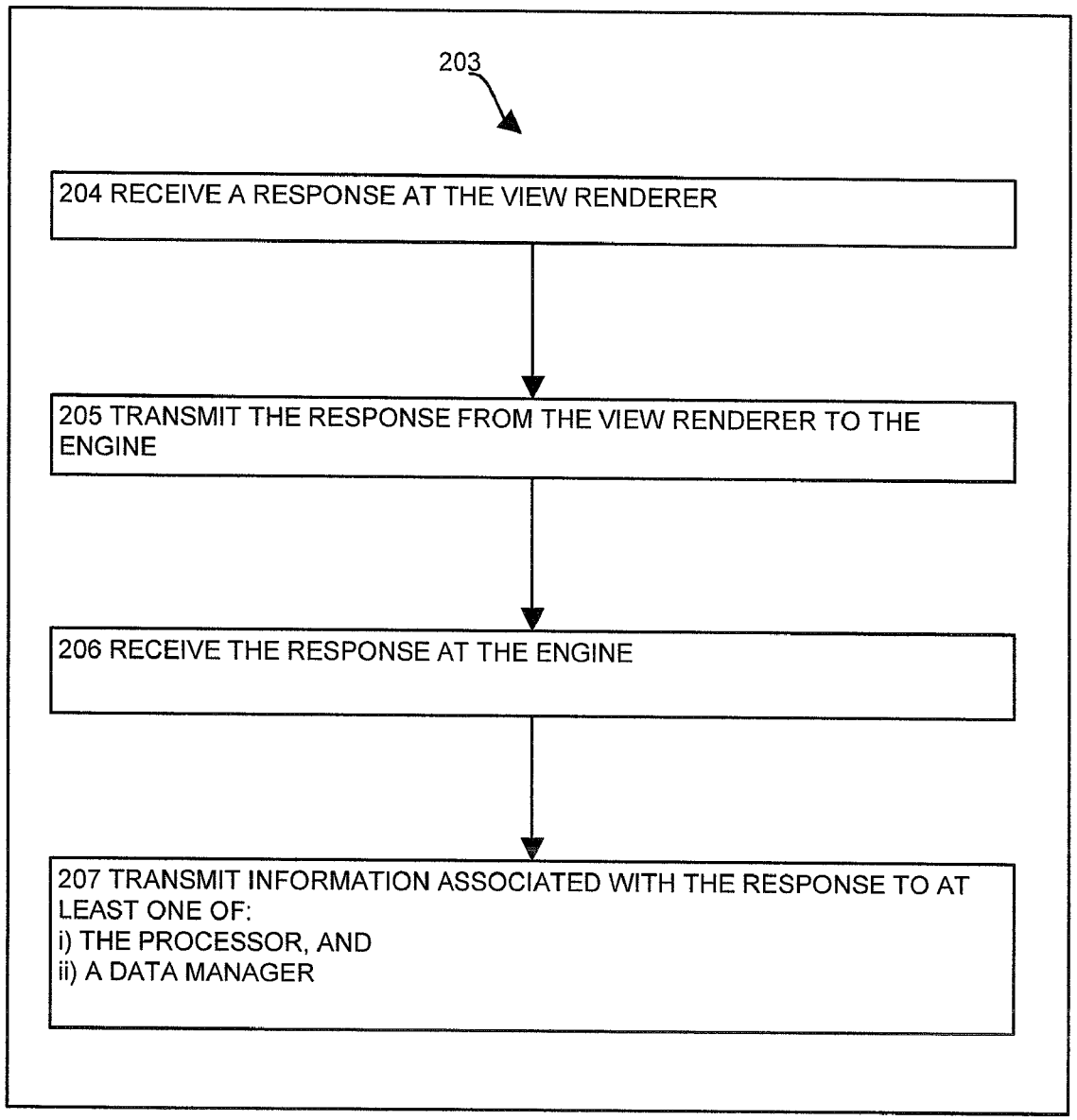
FIG. 5 illustrates a flowchart of a procedure performed by the system of FIG. 1 when the use case application executing process receives a response at the viewer, according to one embodiment disclosed herein.

FIG. 5 is a continuation of FIG. 4 of a flowchart of the steps performed by the use case application executing process 140-2 when it receives a response at the view renderer 110.

In step 204, the use case application executing process 140-2 receives a response at the view renderer 110. In an example embodiment, a screen representation is generated by the screen processor 130, and transmitted to the engine 115. The engine 115 transmits the screen representation to the view renderer 110 where the screen representation is convert to XML data to be rendered, as a screen, within the application rendering graphical user interface 160. A user 108, interacting with the application rendering graphical user interface 160, may select a button on the screen. This response is transmitted, as a response file, back to the view renderer 110.

In step 205, the use case application executing process 140-2 transmits the response from the view renderer 110 to the engine 115. The view renderer 110 receives a response file, and transmits the response file to the engine 115, where the engine 115 processes the results contained within the response file.

In step 206, the use case application executing process 140-2 receives the response at the engine 115. The engine 115 parses the response file to determine where to transmit the data contained within the response file.

In step 207, the use case application executing process 140-2 transmits information associated with the response to at least one of:

i) the processor (i.e., the command processor 125 and/or the screen processor 130), and ii) a data manager 120.

In an example embodiment, the engine 115 determines the response file contains instructions to be executed, or perhaps, another screen to render on the application rendering graphical user interface 160. The engine 115 then transmits chunks of the response file to the respective processor, (i.e., the command processor 125 or the screen processor 130). The engine 115 may also update the data manager 120 with data contained within the response file. For example, a user 108 interacting with the application rendering graphical user interface 160, may enter information, such as an account number, in a data form field within the screen (displayed on the application rendering graphical user interface 160). The account number (entered by the user 108) is included in the response file that is received at the view renderer 110, and transmitted to the engine 115. The engine 115 parses the response file, and transmits the account number to the data manager 120 to update the data repository in the data manager 120, with the user's 108 account number. In an example embodiment, the data manager 120 contains descriptions of data, rules associated with data, information associated with the storing of the data values, etc. In another example embodiment, the data manager 120 can perform a rollback action. The roll back action allows the data manager 120 to roll back data values, for example, if a user 108, interacting with the application enters data on a screen, and then selects a 'back' button on the application rendering graphical user interface 160 to return to a previous screen.

FIG. 6 is a flowchart of the steps performed by the use case application executing process 140-2 when it obtains a file associated with at least one interaction that satisfies a requirement of the application.

In step 208, the use case application executing process 140-2 obtains a file associated with at least one interaction that satisfies a requirement of the application. The file is associated with an application rendering graphical user interface 160 allowing a user 108 to define at least one interaction, as a use case. The file contains at least one instruction for processing by the use case application executing process 140-2. In an example embodiment, the file is received at the site reader 105.

In step 209, the use case application executing process 140-2 receives, at a site reader 105, a plurality of files associated with the application. The plurality of files is received from the application generating graphical user interface 170 allowing an application generating user (not shown) to define at least one interaction as a use case. FIG. 3 is an example embodiment of a application generating graphical user interface 170 that allows allowing an application generating user (not shown), such as a business analyst to define a use case that satisfies a requirement of the application. The plurality of files contains information associated with all the components of the application. The files contain the rules for displaying all the screens and performing all of the operations associated with executing the application.

In step 210, the use case application executing process 140-2 parses, at the site reader 105, the file to obtain at least one instruction. The file is associated with the plurality of files. In an example embodiment, a file may contain XML data objects. The use case application executing process 140-2 then transmits the XML data objects from the site reader 105 to the data manager 120 to define all the data objects, with display and validation rules of the data objects declared in the use case. In another example embodiments, a file may contain instructions for building a screen to display on the application rendering graphical user interface 160. The use case application executing process 140-2 then transmits chunks of the file (containing XML screen objects) from the site reader 105 to the screen processor 130. The screen processor 130 then builds a screen representation for execution of the screen within the application on the application rendering graphical user interface 160.

In step 211, the use case application executing process 140-2 determines the processor suitable for processing at least one instruction. Based on the instruction contained within the file, the use case application executing process 140-2 may determine that either the command processor 125 or the screen processor 130 is the suitable processor for processing that instruction.

In step 212, the use case application executing process 140-2 determines at least a portion of the file required for transmittal to the processor for processing at least one instruction. The use case application executing process 140-2 parses the file to determine which chunk of the file contains all the necessary information that the processor (i.e., the command processor 125 or the screen processor 130) will require to process the instruction contained within the file. The use case application executing process 140-2 then transmits the chunk of the file to the appropriate processor (i.e., the command processor 125 or the screen processor 130).

Alternatively, in step 213, the use case application executing process 140-2 transmits, from the site reader 105, to the data manager 120, data associated with at least one file associated with the plurality of files received from the application generating graphical user interface 170. In an example embodiment, the use case application executing process 140-2 transmits XML data objects from the site reader 105 to the data manager 120. The XML data objects are available, as needed, to the command processor 125, screen processor 130 and/or sub processors 135-N.

FIG. 7 is a flowchart of the steps performed by the use case application executing process 140-2 when it transmits at least a portion of the file to a processor for processing of at least a portion of the file.

In step 214, the use case application executing process 140-2 transmits at least a portion of the file to a processor for processing of at least a portion of the file. The processor is selected based on at least one instruction contained within the file.

In step 215, the use case application executing process 140-2 transmits at least a portion of the file to a processor from the site reader 105. In an example embodiment, the use case application executing process 140-2 transmits chunks of the file to the appropriate processor (i.e., the command processor 125 or the screen processor 130) from either the site reader 105. The site reader 105 receives the whole application as a plurality of files from the application generating graphical user interface 170 that allows the requirement of the application to be defined as a use case. During execution of the application, the engine 115 receives the response (from the execution of the application, i.e., interaction with the application by a user 108) via the view renderer 110. The view renderer 110 then transmits the response, in the form of a response file, to the engine 115. The engine 115 then parses the response file to determine the appropriate processor (i.e., the command processor 125 or the screen processor 130) to handle the next instruction within the response file.

In step 216, the use case application executing process 140-2 transmits at least a portion of the file to a screen processor 130. At least a portion of the file includes screen objects necessary to render a screen within the application. In an example embodiment, the use case application executing process 140-2 transmits a chunk of the file containing XML screen objects, from the site reader 105, to the screen processor 130. In another example embodiment, the use case application executing process 140-2 transmits a chunk of the file containing direction to build a screen, from the engine 115 to the screen processor 130.

In step 217, the use case application executing process 140-2 receives, at the screen processor 130, data from the data manager 120. The data is associated with rendering the screen within the application. The screen processor 130 receives data values from the data manager 120. The data values are necessary to build the screen to render within the application rendering graphical user interface 160 when executing the application. In actuality, the screen processor creates a high level description of the next interactive step, defining the values to present and the paths available to the external entity (i.e., the execution application).

FIG. 8 is a flowchart of the steps performed by the use case application executing process 140-2 when it transmits at least a portion of the file to a processor from the site reader 105.

In step 218, the use case application executing process 140-2 transmits at least a portion of the file to a processor from the site reader 105. In an example embodiment, the use case application executing process 140-2 transmits chunks of the file to the appropriate processor (i.e., the command processor 125 or the screen processor 130) from the site reader 105. The site reader 105 receives the whole application as a plurality of files from the application generating graphical user interface 170 that allows the requirement of the application to be defined as a use case. During execution of the application, the engine 115 receives the response (from the execution of the application, i.e., interaction with the application by a user 108) via the view renderer 110.

In step 219, the use case application executing process 140-2 transmits at least a portion of the file to a command processor 125. The command processor 125 is capable of executing an action indicated by at least a portion of the file. In an example embodiment, the command processor 125 receives XML commands from the site reader 105.

In step 220, the use case application executing process 140-2 determines, from at least a portion of the file, a sub processor 135-N suitable for processing at least a portion of the file. In an example embodiment, the command processor 125 transmits the portion of the file to a sub processor 135-N such that the sub processor 135-N executes the action associated with the portion of the file. The sub processors 135-N may include, but are not limited to:

Audit Processor
    Authorization Processor
    Profile Processor
    Authenticate Processor
    Workflow Processor
    SQL Processor
    Control Processor
    Math Processor
    Message Processor In step 221, the use case application executing process 140-2 transmits at least a portion of the file to the sub processor 135-N. The sub processor 135-N is in communication with a data manager 120. The sub processor 135-N receives data values from the data manager 120, and sends (updated) data values in the data manager 120. The use case application executing process 140-2 transmits a chunk of the file to the appropriate sub processor 135-1. The chunk of the file contains the instructions and information necessary for the sub processor 135-1 to perform the XML commands contained within the chunk of the file.

In step 222, the use case application executing process 140-2 receives, at the sub processor 135-1, data necessary to execute the action indicated by at least a portion of the file. The data is received from the data manager 120. In an example embodiment, the command processor 125 receives the chunk of the file from the engine 115, and transmits the chunk of the file to the sub processor 135-1.

In step 223, the use case application executing process 140-2 executes the action, indicated by at least a portion of the file, at the sub processor 135-1. The sub processor 135-1 executes XML commands received via the command processor 125.

In step 224, the use case application executing process 140-2 transmits, to the data manager 120, data resulting from the action executed at the sub processor 135-1. Upon completion of execution of the XML commands (received from the command processor 125), the sub processor 135-1 transmits data values (i.e., updated data values) to the data manager 120.

Figure 9:
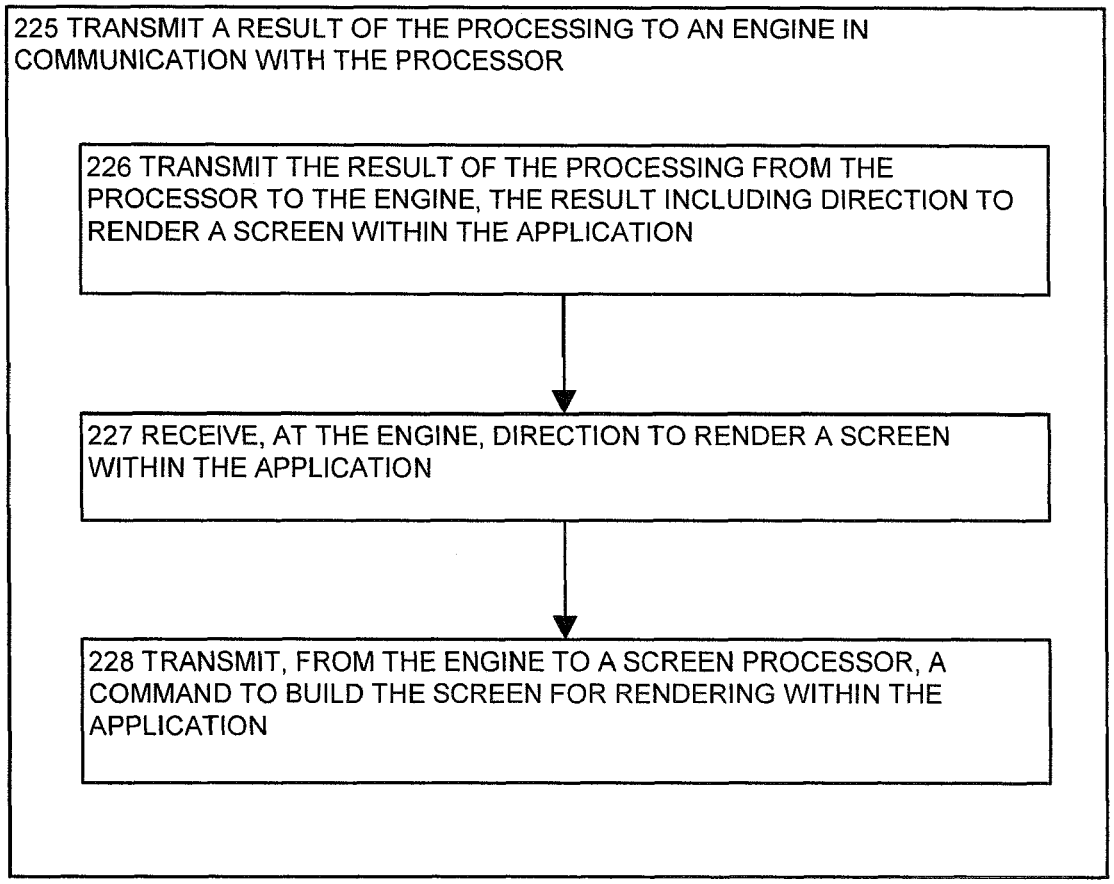
FIG. 9 illustrates a flowchart of a procedure performed by the system of FIG. 1 when the use case application executing process transmits a result of the processing to an engine in communication with the processor, according to one embodiment disclosed herein.

FIG. 9 is a flowchart of the steps performed by the use case application executing process 140-2 when it transmits a result of the processing to an engine 115 in communication with the processor (i.e., the command processor 125 or the screen processor 130).

In step 225, the use case application executing process 140-2 transmits a result of the processing to an engine 115 in communication with the processor (i.e., the command processor 125 or the screen processor 130). In an example embodiment, the command processor 125 complete execution of a XML command. The result of that execution may result in updating the data manager 120 with data values. The result of that execution may determine that a screen needs to be rendered on the application rendering graphical user interface 160. For example, a user 108 enters login and password information in a screen on an application rendering graphical user interface 160. The data entered by the user 108 is rendered as a response file that is transmitted back to the engine 115 via the view renderer 110. The engine 115 updates the data manager 120 with the login and password data value entered by the user 108. The engine 115 transmits an instruction to the command processor 125 to authenticate the login and password. The command processor 125 transmits the instruction to a sub processor 135-2 responsible for authenticating the login and password. The sub processor 135-2 receives the data values (entered by the user 108) from the data manager 120. The sub processor 135-2 then performs the authentication of the login and password. Upon completion, the command processor 125 transmits notification to the engine 115 of the next screen that is to be rendered on the application rendering graphical user interface 160. For example, if the login and password information that the user 108 entered is incorrect, the next screen to be rendered is a "Sorry, try again" screen. If the login and password information that the user 108 entered is correct, the next screen to be rendered is a screen displaying the user's 108 account information.

In step 226, the use case application executing process 140-2 transmits the result of the processing from the processor (i.e., the command processor 125 or the screen processor 130) to the engine 115. The result may include direction to render a screen within the application. In an example embodiment, the command processor 125 executes an action, and determines that the next step in the execution of the application is the rendering of a screen. The command processor 125 transmits the result to the engine 115 including direction to render a screen within the application on the application rendering graphical user interface 160.

In step 227, the use case application executing process 140-2 receives, at the engine 115, direction to render a screen within the application. In an example embodiment, the engine 115 receives this notification from the command processor 125.

In step 228, the use case application executing process 140-2 transmits, from the engine 115 to a screen processor 130, a command to build the screen for rendering within the application. In an example embodiment, the engine 115 transmits a build screen notification to the screen processor 130. The screen processor 130 then creates a screen representation, and transmits the screen representation back to the engine 115.

Figure 10:
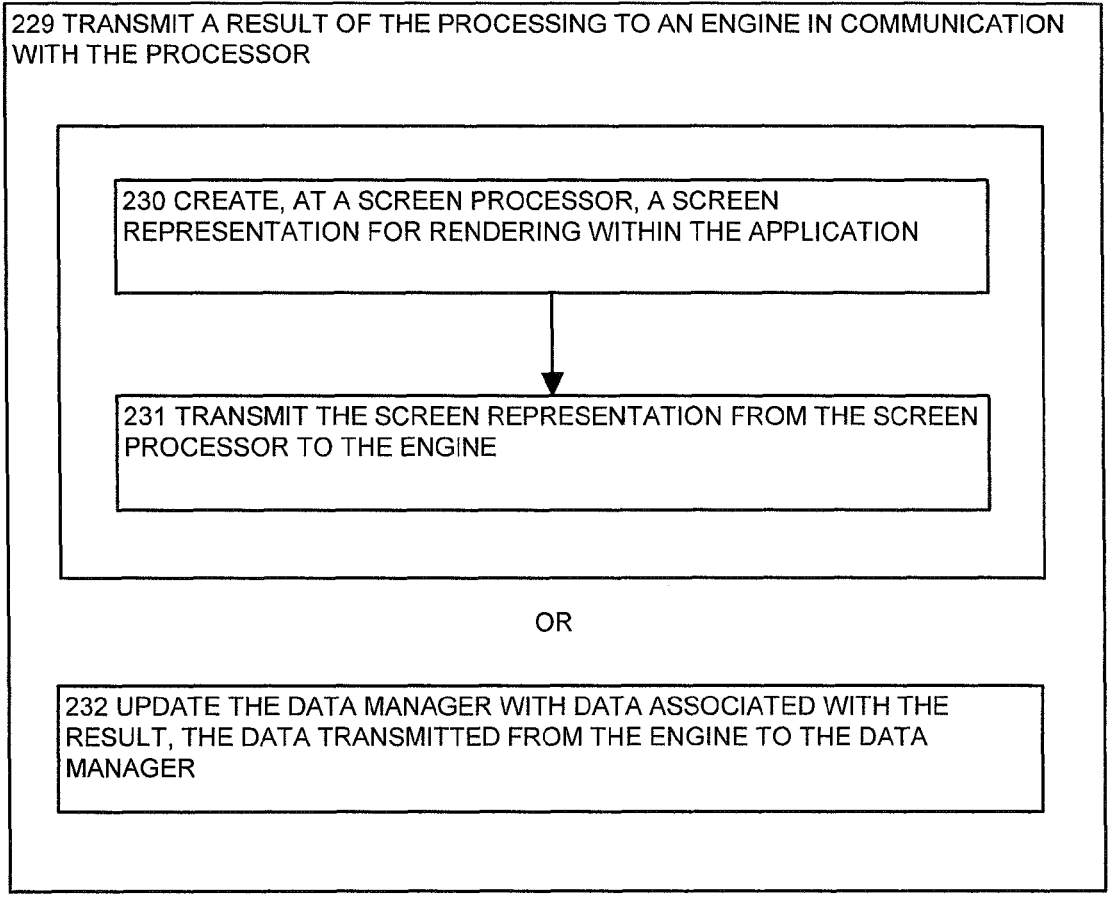
FIG. 10 illustrates a flowchart of a procedure performed by the system of FIG. 1 when the use case application executing process transmits a result of the processing to an engine in communication with the processor, and creates, at a screen processor, a screen representation for rendering within the application, according to one embodiment disclosed herein.

FIG. 10 is a flowchart of the steps performed by the use case application executing process 140-2 when it transmits a result of the processing to an engine 115 in communication with the processor (i.e., the command processor 125 or the screen processor 130).

In step 229, the use case application executing process 140-2 transmits a result of the processing to an engine 115 in communication with the processor (i.e., the command processor 125 or the screen processor 130). In an example embodiment, the command processor 125 transmits a result to the engine 115. The result indicates that the command processor 125 has executed an action (for example, the command processor 125 has executed XML action groups sent to the command processor 125 by the site reader 105). The command processor 125 may also send notification to the engine 115 that the next step in the application is for a screen to be built (by the screen processor 130). In this scenario, the engine 115 would then send notification to the screen processor 130 to build the necessary screen.

In step 230, the use case application executing process 140-2 creates, at a screen processor 130, a screen representation for rendering within the application. The screen representation contains, information necessary for rendering the screen within the application on the application rendering graphical user interface 160.

In step 231, the use case application executing process 140-2 transmits the screen representation from the screen processor 130 to the engine 115. In an example embodiment, the screen representation defines the data to display on the screen, the buttons to display on the screen, how the buttons are grouped within the screen, any data fields requiring input by a user 108, etc.

Alternatively, in step 232, the use case application executing process 140-2 updates the data manager 120 with data associated with the result. The data is transmitted from the engine 115 to the data manager 120. In an example embodiment, upon receiving the screen representation, at the engine 115 from the screen processor 130, the use case application executing process 140-2 updates the data manager 120 with data values.

FIG. 11 is a flowchart of the steps performed by the use case application executing process 140-2 when it transmits the result from the engine 115 to a view renderer 110 for execution of at least one instruction contained in the file.

In step 233, the use case application executing process 140-2 transmits the result from the engine 115 to a view renderer 110 for execution of at least one instruction contained in the file. The file is associated with at least one interaction, as a user case, that satisfies the requirement of the application. The file is generated at the application generating graphical user interface 170. In an example embodiment, the view renderer 110 receives the result from the engine 115 and converts the result to an HTML file to be rendered on the application rendering graphical user interface 160. More specifically, the view renderer 110 creates an XML representation of the result. That XML representation of the result is applied with an XML transform to generate the HTML file. In another example embodiment the XML transform is an extended XML transform capable of handling tables within the XML representation.

In step 234, the use case application executing process 140-2 transmits a screen representation, from the engine 115 to the view renderer 110. The screen representation is received from a screen processor 130. In an example embodiment, the screen representation is a standalone object containing all the necessary components (i.e., display items, buttons, data, etc.) to generate the screen within the application rendering graphical user interface 160.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of executing an application, the method comprising:
   obtaining a file associated with at least one interaction that satisfies a requirement of the application, the file associated with a graphical user interface allowing a user to define the at least one interaction, as a use case, the file containing at least one instruction;
   transmitting at least a portion of the file to a processor for processing of the at least a portion of the file, the processor selected based on the at least one instruction;
   transmitting a result of the processing to an engine in communication with the processor; and
   transmitting the result from the engine to a view renderer for execution of the at least one instruction contained in the file associated with the at least one interaction that satisfies the requirement of the application,
   wherein obtaining a file associated with at least one interaction that satisfies a requirement of the application comprises;
   receiving, at a site reader, a plurality of files associated with the application, the plurality of files received from the graphical user interface allowing a user to define the at least one interaction as a use case;
   parsing, at the site reader, the file to obtain the at least one instruction, the file associated with the plurality of files;
   determining the processor suitable for processing the at least one instruction; and
   determining the at least a portion of the file required for transmittal to the processor for processing the at least one instruction.

2. The method of claim 1 further comprising:
   receiving a response at the view renderer; and
   transmitting the response from the view renderer to the engine.

3. The method of claim 2 comprising:
   receiving the response at the engine; and
   transmitting information associated with the response to at least one of:
   i) the processor; and
   ii) a data manager.

4. The method of claim 1 comprising:
   transmitting, from the site reader, to the data manager, data associated with at least one file associated with the plurality of files received from the graphical user interface.

5. The method of claim 1 wherein transmitting at least a portion of the file to a processor for processing of the at least a portion of the file comprises:

transmitting the at least a portion of the file to a processor from the site reader.

6. The method of claim 5 wherein transmitting the at least a portion of the file to a processor comprises:
   transmitting at least a portion of the file to a screen processor, the at least a portion of the file including screen objects necessary to render a screen within the application.

7. The method of claim 6 further comprising:
   receiving, at the screen processor, data from the data manager, the data associated with rendering the screen within the application.

8. The method of claim 5 wherein transmitting the at least a portion of the file to a processor comprises:
   transmitting the at least a portion of the file to a command processor, the command processor capable of executing an action indicated by the at least a portion of the file.

9. The method of claim 8 further comprising:
   determining, from the at least a portion of the file, a sub processor suitable for processing the at least a portion of the file; and
   transmitting the at least a portion of the file to the sub processor, the sub processor in communication with a data manager.

10. The method of claim 9 further comprising:
    receiving, at the sub processor, data necessary to execute the action indicated by the at least a portion of the file, the data received from the data manager.

11. The method of claim 10 further comprising:
    executing the action, indicated by the at least a portion of the file, at the sub processor; and
    transmitting, to the data manager, data resulting from the action executed at the sub processor.

12. The method of claim 1 wherein transmitting a result of the processing to an engine in communication with the processor comprises:
    transmitting the result of the processing from the processor to the engine, the result including direction to render a screen within the application.

13. The method of claim 12 further comprising:
    receiving, at the engine, direction to render a screen within the application; and
    transmitting, from the engine to a screen processor, a command to build the screen for rendering within the application.

14. The method of claim 1 wherein transmitting a result of the processing to an engine in communication with the processor comprises:
    creating, at a screen processor, a screen representation for rendering within the application; and
       transmitting the screen representation from the screen processor to the engine.

15. The method of claim 1 wherein transmitting a result of the processing to an engine in communication with the processor comprises:
    updating the data manager with data associated with the result, the data transmitted from the engine to the data manager.

16. The method of claim 1 wherein transmitting the result from the engine to a view renderer for execution of the at least one instruction contained in the file associated with the at least one interaction that satisfies the requirement of the application comprises:
    transmitting a screen representation, from the engine to the view renderer, the screen representation received from a screen processor.

17. The method as in claim 1, wherein determining the processor suitable for processing the at least one instruction includes:
    identifying a screen processor, wherein the screen processor defines representations of a plurality of screens to be instantiated for a new website, wherein a representation of a first screen is defined to be compatible for receipt of input indicating the at least one interaction, wherein a representation of a second screen is defined to represent a result from processing the at least one interaction, wherein the screen processor creates a path, to be followed by the new website, upon the new website receiving a live instance of the interaction, wherein the screen processor comprises a software module.

18. A computerized device comprising:
    a memory;
    a processor;
    a communications interface;
    an interconnection mechanism coupling the memory, the processor and the communications interface;
    wherein the memory is encoded with a use case application executing software that when executed on the processor is capable of executing an application on the computerized device by performing the operations of:
       obtaining a file associated with at least one interaction that satisfies a requirement of the application, the file associated with a graphical user interface allowing a user to define the at least one interaction, as a use case, the file containing at least one instruction;
       transmitting at least a portion of the file to a processor for processing of the at least a portion of the file, the processor selected based on the at least one instruction;
    transmitting a result of the processing to an engine in communication with the processor; and
    transmitting the result from the engine to a view renderer for execution of the at least one instruction contained in the file associated with the at least one interaction that satisfies the requirement of the application, wherein obtaining a file associated with at least one interaction that satisfies a requirement of the application comprises;
       receiving, at a site reader, a plurality of files associated with the application, the plurality of files received from the graphical user interface allowing a user to define the at least one interaction as a use case;
       parsing, at the site reader, the file to obtain the at least one instruction, the file associated with the plurality of files;
       determining the processor suitable for processing the at least one instruction; and
       determining the at least a portion of the file required for transmittal to the processor for processing the at least one instruction.

19. The computerized device as in claim 18, wherein the operations for determining the processor suitable for processing the at least one instruction include at least one operation for:
    identifying a screen processor, wherein the screen processor defines representations of a plurality of screens to be instantiated for a new website, wherein a representation of a first screen is defined to be compatible for receipt of input indicating the at least one interaction, wherein a representation of a second screen is defined to represent a result from processing the at least one interaction, wherein the screen processor creates a path, to be followed by the new website, upon the new website receiving a live instance of the interaction, wherein the screen processor comprises a software module.

20. A non-transitory computer readable medium encoded with computer programming logic that when executed on a process in a computerized device provides application execution, the medium comprising:

instructions for obtaining a file associated with at least one interaction that satisfies a requirement of the application, the file associated with a graphical user interface allowing a user to define the at least one interaction, as a use case, the file containing at least one instruction;

instructions for transmitting at least a portion of the file to a processor for processing of the at least a portion of the file, the processor selected based on the at least one instruction;

instructions for transmitting a result of the processing to an engine in communication with the processor; and instructions for transmitting the result from the engine to a view renderer for execution of the at least one instruction contained in the file associated with the at least one interaction that satisfies the requirement of the application, wherein the instructions for obtaining a file associated with at least one interaction that satisfies a requirement of the application include instructions for receiving, at a site reader, a plurality of files associated with the application, the plurality of the files received from the graphical user interface allowing a user to define the at least one interaction as a use case;

instructions for parsing, at the site reader, the file to obtain the at least one instruction, the file associated with the plurality of files;

instructions for determining the processor suitable for processing the at least one instruction; and instructions for determining the at least a portion of the file required for transmittal to the processor for processing the at least one instruction.

21. The non-transitory computer readable medium of claim 20, wherein the instructions for determining the processor suitable for processing the at least one instruction include:

instructions for identifying a screen processor, wherein the screen processor defines representations of a plurality of screens to be instantiated for a new website, wherein a representation of a first screen is defined to be compatible for receipt of input indicating the at least one interaction, wherein a representation of a second screen is defined to represent a result from processing the at least one interaction, wherein the screen processor creates a path, to be followed by the new website, upon the new website receiving a live instance of the interaction, wherein the screen processor comprises a software module.

* * * * *